US012579769B2

(12) United States Patent
Wiley et al.

(10) Patent No.: US 12,579,769 B2
(45) Date of Patent: Mar. 17, 2026

(54) MAPPING AND SEGMENTATION OF ORAL MAXILLOFACIAL COMPLEX AND EXTRACTING CLINICAL DATA

(71) Applicants: Stratovan Corporation, Davis, CA (US); BeamReaders, Kennewick, WA (US)

(72) Inventors: David Wiley, Davis, CA (US); Christian Woodhouse, Davis, CA (US); David Hatcher, Kennewick, WA (US)

(73) Assignees: STRATOVAN CORPORATION, Davis, CA (US); BEAMREADERS, Kennewick, WA (US)

( * ) Notice: Subject to any disclaimer, the term of this patent is extended or adjusted under 35 U.S.C. 154(b) by 70 days.

(21) Appl. No.: 18/077,141

(22) Filed: Dec. 7, 2022

(65) Prior Publication Data

US 2024/0193883 A1    Jun. 13, 2024

(51) Int. Cl.
| | |
|---|---|
| *G06T 19/20* | (2011.01) |
| *A61C 13/34* | (2006.01) |
| *G06T 7/12* | (2017.01) |
| *G06T 7/73* | (2017.01) |
| *G06T 17/20* | (2006.01) |

(52) U.S. Cl.
CPC .............. *G06T 19/20* (2013.01); *A61C 13/34* (2013.01); *G06T 7/12* (2017.01); *G06T 7/75* (2017.01); *G06T 17/20* (2013.01); *G06T*

*2200/08* (2013.01); *G06T 2207/20021* (2013.01); *G06T 2210/41* (2013.01); *G06T 2219/008* (2013.01); *G06T 2219/2021* (2013.01)

(58) Field of Classification Search
CPC ............ G06T 19/20; G06T 7/12; A61C 13/34
See application file for complete search history.

(56) References Cited

U.S. PATENT DOCUMENTS

| | | | | |
|---|---|---|---|---|
| 2012/0059382 | A1* | 3/2012 | Paulos ............... | A61B 17/1714 |
| | | | | 606/96 |
| 2020/0000552 | A1* | 1/2020 | Mednikov ............... | G06T 19/20 |
| 2020/0210540 | A1* | 7/2020 | Bala ..................... | A45D 44/002 |
| 2022/0254101 | A1* | 8/2022 | Osuga ..................... | G06T 17/00 |
| 2022/0318989 | A1* | 10/2022 | Chelnokov ........... | G06T 7/0012 |
| 2022/0323190 | A1* | 10/2022 | Kopelman ............... | G06T 7/11 |

* cited by examiner

*Primary Examiner* — Abderrahim Merouan
(74) *Attorney, Agent, or Firm* — FOLEY & LARDNER LLP

(57) ABSTRACT

Example implementations include a method of constructing a dentition structure by a topographic mesh therefor, by generating one or more edges geometrically connecting one or more landmarks, the landmarks being associated with one or more physical features of a physical object, generating a mesh model including the edges and the landmarks, identifying at least one boundary of the mesh model based on one or more of the edges and the landmarks, selecting at least one mesh region associated with at least one corresponding physical feature of the physical object, projecting the selected mesh region onto a predetermined projection plane to form a mesh projection, and constructing the physical features of the physical object based on the mesh projection.

18 Claims, 9 Drawing Sheets

700

Transform Processor 730

Parallel Processor 720

712

System Processor 710

714

Communication Interface 750

System Memory 740

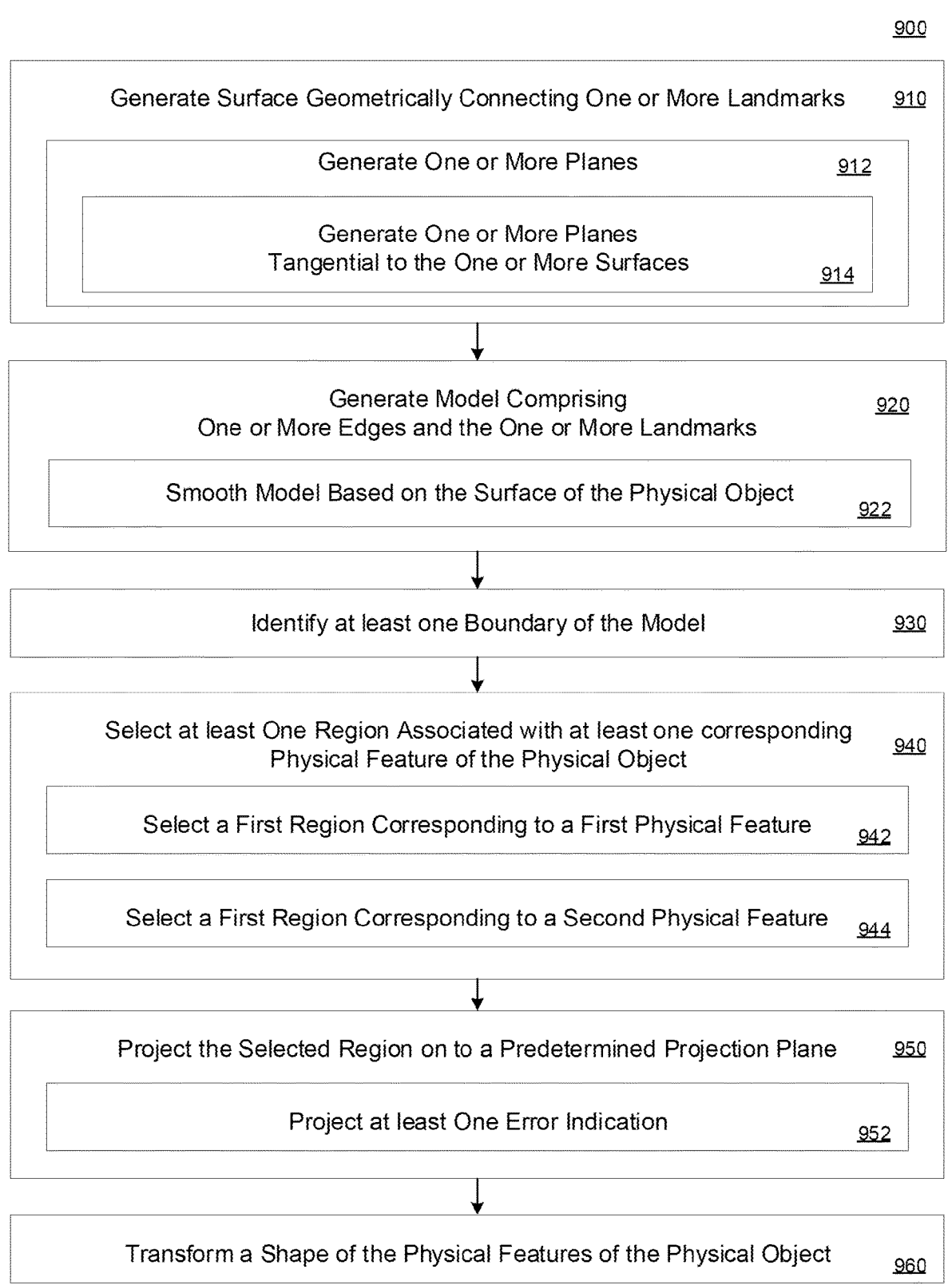

900

Generate Surface Geometrically Connecting One or More Landmarks     910

Generate One or More Planes     912

Generate One or More Planes
Tangential to the One or More Surfaces     914

Generate Model Comprising     920
One or More Edges and the One or More Landmarks Smooth Model Based on the Surface of the Physical Object     922

Identify at least one Boundary of the Model     930

Select at least One Region Associated with at least one corresponding     940
Physical Feature of the Physical Object Select a First Region Corresponding to a First Physical Feature     942

Select a First Region Corresponding to a Second Physical Feature     944

Project the Selected Region on to a Predetermined Projection Plane     950

Project at least One Error Indication     952

Transform a Shape of the Physical Features of the Physical Object     960

Fig. 9

MAPPING AND SEGMENTATION OF ORAL MAXILLOFACIAL COMPLEX AND EXTRACTING CLINICAL DATA

TECHNICAL FIELD

The present implementations relate generally to biomedical imaging, and more particularly to transforming a dentition structure.

BACKGROUND

Biomedical imaging requires increasing complex biomedical data input and computational processing to achieve successful medical outcomes. Conventional systems may not effectively process biomedical imaging information with sufficient speed and at sufficient granularity to support individualized patient care.

SUMMARY

It may be advantageous to process biomedical data associated with a patient and generate a reconstructed model indicating a two-dimensional projection of a model of a dentition mode from an predetermined viewing plane. Thus, a technological solution for transforming a dentition structure can be provided.

A technical solution can include a method of transforming a dentition structure, by generating a surface geometrically connecting one or more landmarks, the landmarks being associated with one or more physical features of a physical object, generating a model including the edges and the landmarks, identifying at least one boundary of the model based on one or more of the edges and the landmarks, selecting at least one region associated with at least one corresponding physical feature of the physical object, projecting the selected region onto a predetermined projection plane to form a projection, and transforming a shape of the physical features of the physical object based on the projection.

The method can include smoothing the model based on the surface and at least one target landmark among the landmarks connected to the edge.

The method can include generating one or more planes corresponding to one or more surfaces of the physical object.

The method can include planes that correspond to one or more of the landmarks.

The method can include generating one or more planes tangential to one or more surfaces of the physical object.

The method can include a boundary that includes a plurality of boundary edges among the edges.

The method can include a physical object that is a dentition structure and the physical features include one or more teeth and soft tissue adjacent to the teeth.

The method can include a predetermined projection plane corresponds to a frontal view of the physical object, and is substantially aligned with an anatomical frontal plane of the physical object.

The method can include selecting a first region corresponding to a first physical feature of the physical object, and selecting a second region corresponding to a second physical feature of the physical object.

The method can include a physical object including a maxillofacial structure, and the first physical feature includes an upper dental arch region.

The method can include a second physical feature includes a lower dental arch region.

The method can include projecting the selected region onto a predetermined projection plane to form a projection by projecting at least one error indication onto the predetermined projection plane.

A technical solution can include a system for transforming a dentition structure. The system can include a topography engine configured to generate a surface geometrically connecting one or more landmarks, the landmarks being associated with physical features of a physical object, and to generate a model including the surface and the landmarks, and a construction engine operatively coupled to the topography engine and configured to identify at least one boundary of the model based on the surface and the landmarks, to select at least one region associated with at least one corresponding physical feature of the physical object, to project the selected region onto a predetermined projection plane to form a projection and to transform a shape of the physical features of the physical object based on the projection.

The system can include an image processing engine configured to obtain one or more images of the physical object, and to generate a three-dimensional model of the physical structure including the physical features, and a landmark processing engine operatively coupled to the image processing engine and the topography engine, and configured to associate the landmarks with one or more corresponding geometric locations with the three-dimensional model, the geometric location corresponding to one or more of the physical features.

The system can include a topography engine configured to smooth the model based on the surface and at least one target landmark among the landmarks connected to the edge.

The system can include a topography engine configured to generate one or more planes corresponding to one or more surfaces of the physical object.

The system can include planes correspond to one or more of the landmarks.

The system can include generating one or more planes tangential to one or more surfaces of the physical object.

A technical solution can include a computer readable medium including one or more instructions stored thereon and executable by a processor to generate, by a processor, a surface geometrically connecting one or more landmarks, the landmarks being associated with one or more physical features of a physical object, generate, by the processor, a model including the edges and the landmarks, identifying at least one boundary of the model based on one or more of the edges and the landmarks, select, by the processor, at least one region associated with at least one corresponding physical feature of the physical object, project, by the processor, the selected region onto a predetermined projection plane to form a projection, and transform, by the processor, a shape of the physical features of the physical object based on the projection.

The computer readable medium can include instructions executable by the processor to project, by the processor, at least one error indication onto the predetermined projection plane.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 9 illustrates a method of transforming a dentition structure in accordance with present implementations.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Figure 1:
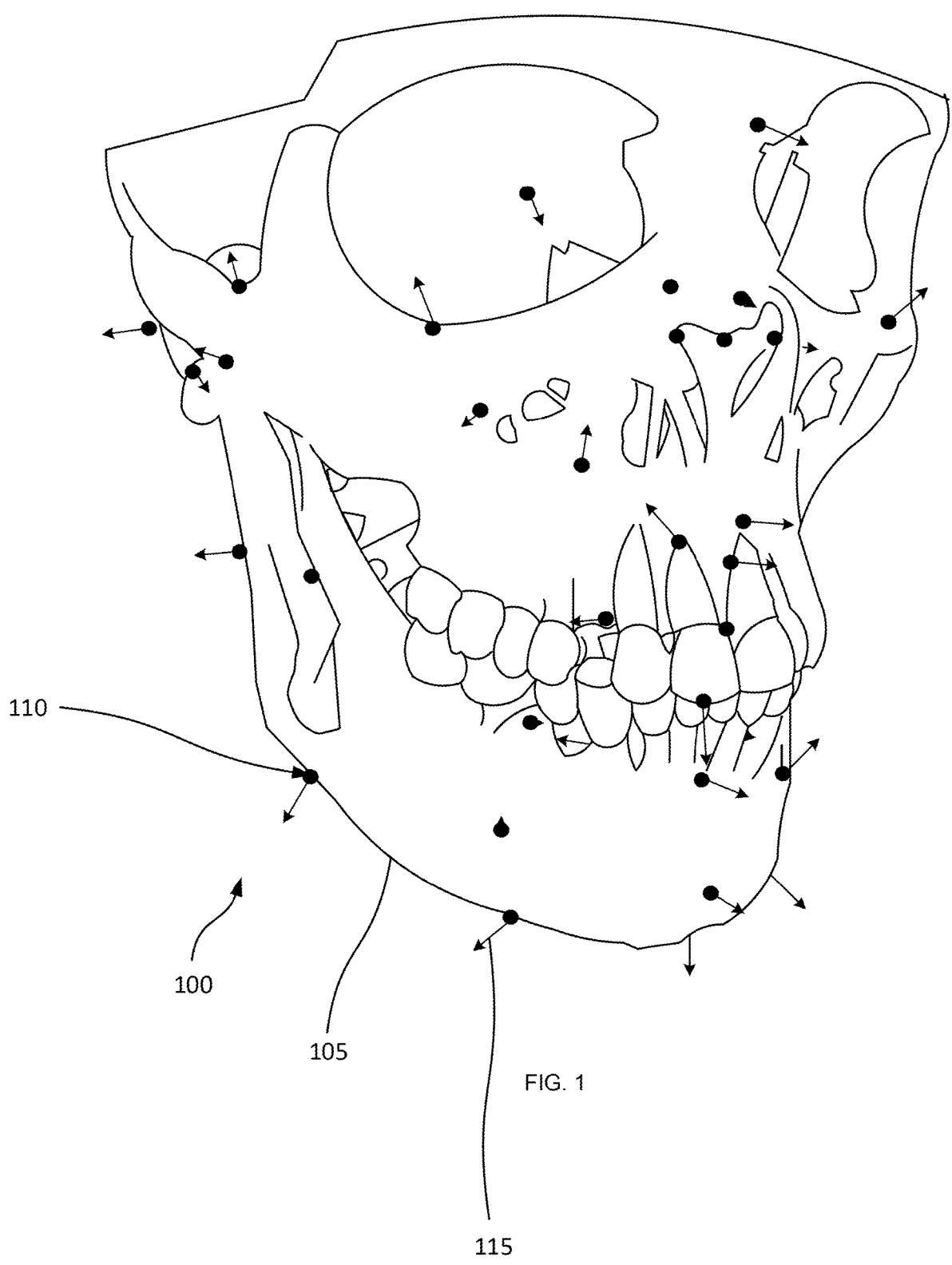
FIG. 1 illustrates a model corresponding to a physical structure, in accordance with present implementations.

FIG. 1 illustrates a model corresponding to a physical structure, in accordance with present implementations. As illustrated by way of example in FIG. 1, an example object model 100 may include an object model source 105. The object model source 105 may include one or more 2D images (e.g., grayscale, RGB, etc.) associated with a patient and combined into 3D model for that patient. The object model source 105 may be formed from multiple Digital Imagining and Communications in Medicine (DICOM) images, the object model source 105 may be presented as a 2D projection on predetermined plane through the 3D model associated with the patient. As on example, a predetermined plane can be a transverse plane, a coronal plane, or a sagittal plane dividing or bisecting the 3D model.

The object model 100 may include a plurality of landmarks 110. The plurality of landmarks are positioned on the object model source 105. The plurality of landmarks 110 include one or more coordinates based on the determination that features of the 3D model or 2D images associated with the 3D model correspond to a particular structure (e.g., maxillofacial structure, etc.) of the 2D model. A structural feature may include a shape, or the like detected in a 2D image or a 3D model. The landmarks 110 may include landmark identifiers indicating a particular feature of a 3D model associated with a patient. As one example, a landmark identifier can include a label or the like indicating that a corresponding landmark is located at or proximate to a particular feature or structure of the 3D model, such as a bone joint, curvature, protrusion, boundary, or the like.

Each of the plurality of landmarks 110 include at least one vector 115 extending in a direction from the landmark. Each of the vectors 115 on the plurality of landmarks may be randomly oriented. The vectors 115 may be oriented to indicate a particular feature of a 3D model associated with a patient. The vectors 115 are used to define at least one plane which define a 3D model associated with the patient, as described herein. The plane defined intersects with the plurality of landmarks 110. The plane defined may be perpendicular to the plurality of vectors 115.

Figure 2:
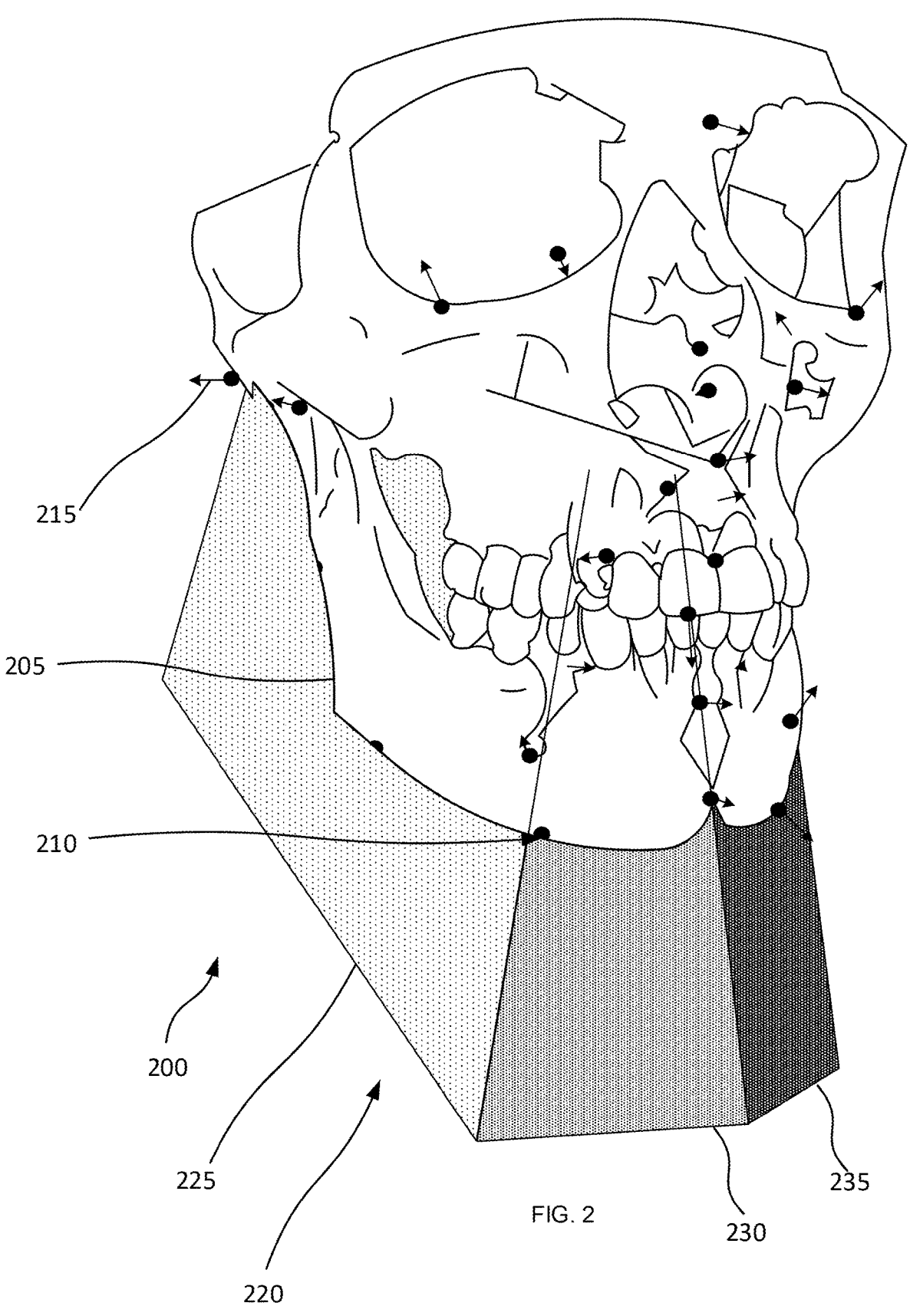
FIG. 2 illustrates a model corresponding to a physical structure and including a first object model, in accordance with present implementations.

FIG. 2 illustrates an object model 200 corresponding to a physical structure and including a first object model, in accordance with present implementations. As illustrated by way of example in FIG. 2, the object model 200 may include an object model source 205. The object model source 205 can be substantially similar to the object model source 105. The object model 200 may include a plurality of landmarks 210. The plurality of landmarks 210 are substantially similar to the plurality of landmarks 110. Each of the plurality of landmarks 210 include a vector 215. The vector 215 can be substantially similar to the vector 115. The vectors 215 of the plurality of landmarks 210 extend so as to cover a greater surface area proportionate to the number of landmarks 210 and vectors 215.

The object model 200 may include a plurality of planes 220. The plurality of planes 220 may be a mesh to define the structure in 2D of the object model source 205, as described herein. The plurality of planes 220 may include a first plane 225, a second plane 230, and a third plane 235. The plurality of planes 220 may include more than three planes. The first plane 225 can be a rectangular plane which intersects with a portion of the plurality of landmarks 210. The first plane 225 may intersect with the portion of the plurality of landmarks 210 and is perpendicular to the vectors 215 of the portion of the plurality of landmarks 210 to approximate the left side of the object model source 205 in 2D. The second plane 230 can be a rectangular plane and intersects with the first plane 225. The second plane 230 intersects with a portion of the plurality of landmarks 210 and may be perpendicular to the vectors 215 of the portion of the plurality of landmarks to approximate a portion of the center of the object model source 205 in 2D. The second plane 230 may approximate the center of the object model source 205. The third plane 235 intersects with the second plane 230 and can be a rectangular plane. The third plane 235 intersects with a portion of the plurality of landmarks 210 and may be perpendicular to the vectors 215 of the portion of the plurality of landmarks 210 to approximate a second portion of the center of the object model source 205 in 2D. The third plane 235 may approximate the left side of the object model source 205 in 2D. The plurality of planes may include a fourth plane which intersects with the third plane and approximates the right side of the object model source 205 in 2D. The first plane 225, the second plane 230, the third plane 235, and the fourth plane form a rough mesh by connecting the plurality of landmarks 210 to approximate the object model source 205. The rough mesh may approximate a maxillofacial structure of a patient.

Figure 3:
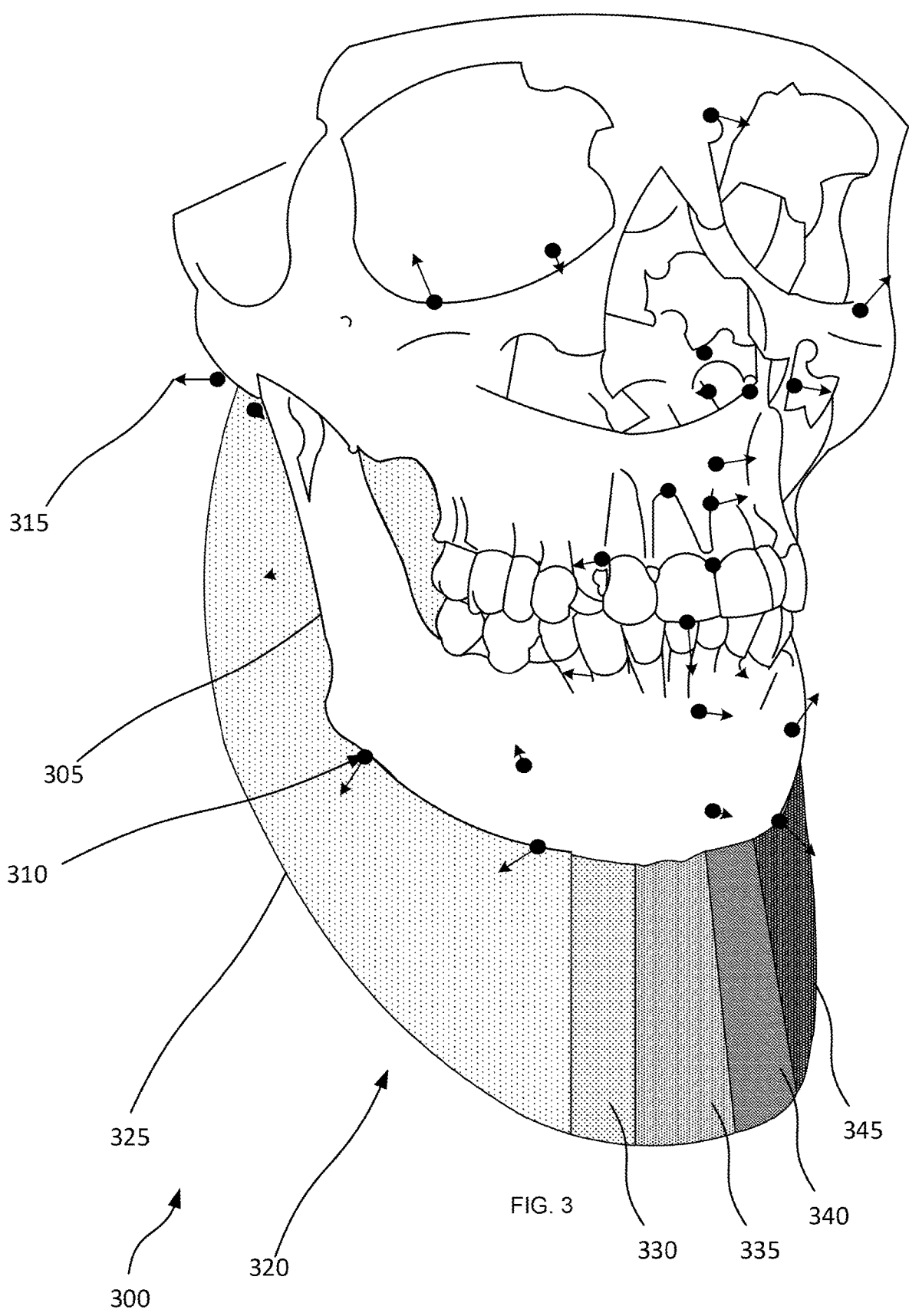
FIG. 3 illustrates a model corresponding to a physical structure and including a second object model, further to the model of FIG. 2.

FIG. 3 illustrates the object model 300 corresponding to a physical structure and including a second object model, further to the model of FIG. 2. As illustrated by way of example in FIG. 3, the object model 300 can be a refined model of object model 200. The object model 300 may include an object model source 305. The object model source 305 substantially similar to the object model source 205. The object model 300 may include a plurality of landmarks 310. The plurality of landmarks substantially similar to the plurality of landmarks 210. Each of the plurality of landmarks 310 include a vector 315. The vector 315 can be substantially similar to the vector 215.

The object model 300 may include a plurality of planes 320. The plurality of planes 320 may include a first plane 325, a second plane 330, a third plane 335, a fourth plane 340, and a fifth plane 345. The plurality of planes may include more than five planes. The first plane 325, the second plane 330, the third plane 335, the fourth plane 340, and the fifth plane 345 can be smoothed to result in a mesh including curved surfaces to match curvature, shape, or the like, of physical features corresponding to the object model 300, as described herein. As illustrated by way of example in FIG. 3, the first plane 225 of FIG. 2 can be refined to be the first plane 325. The first plane 325 may extend through a portion of the plurality of landmarks 310 positioned on the left side of the object model source 305. The first plane 325 may be perpendicular to the vectors 315 of the portion of the plurality of landmarks 310. The first plane 325 may refine the approximation of the left side of the object model source 205 of FIG. 2 in 2D. The first plane 225 of FIG. 2 may be altered (e.g., smoothed, etc.) from a rectangular plane to curvilinear plane as shown in FIG. 3 such that first plane 325 has a shape, curvature, or the like to match the physical features of the object model source 305. The number of planes depicted by way of example herein can be greater than or less than the particular number of planes depicted.

A first portion of the second plane 230 of FIG. 2 can be refined to form the second plane 330. The second plane 330 may extend through a portion of the plurality of landmarks 310 to approximate the center and a portion of the left side of the object model source 305 in 2D. The second plane 330 may be perpendicular to the vectors 315 of the portion of the plurality of landmarks 310. The first portion of the second plane 230 may be altered from a rectangular plane to a curvilinear plane as shown by the second plane 330 such that second plane 330 has a shape, curvature, or the like to match the physical features of the object model source 305.

A second portion of the second plane 230 of FIG. 2 can be refined to be the third plane 335. The third plane 335 may extend through a portion of the plurality of landmarks 310 at the center of the object model source 305. The third plane 335 may be perpendicular to the vectors 315 of portion of the plurality of landmarks 310 at the center of the object model source 305. The second portion of the second plane 230 may be altered from a rectangular plane to form a curvilinear plane as shown by the third plane 335 such that third plane 335 has a shape, curvature, or the like to match the physical features of the object model source 305. The third plane 335 may approximate a portion of the center of the object model source 305 in 2D.

A third portion of the second plane 230 of FIG. 2 and a first portion of the third plane 235 can be refined to be the fourth plane 340. The fourth plane 340 may extend through a portion of the plurality of landmarks 310 at the center of the object model source 305 and a portion of the plurality of landmarks at the right side of the object model source 305. The fourth plane 340 may be perpendicular to the vectors 315 of portion of the plurality of landmarks 310 at the center and at the right side of the object model source 305. The second portion of the second plane 230 and the first portion of the third plane 235 may be altered from a rectangular plane to form a curvilinear plane as shown by the fourth plane 340 such that fourth plane 340 has a shape, curvature, or the like to match the physical features of the object model source 305. The fourth plane 340 approximates a portion of the center and a portion of the right side of the object model source 305 in 2D. The second plane 330, the third plane 335, and the fourth plane 340 may approximate the center of the object model source 305 in 2D.

A second portion of the third plane 235 and the fourth plane (not shown) of FIG. 2 can be refined to be the fifth plane 345. The fifth plane 345 may extend through a portion of the plurality of landmarks 310 at the right side of the object model source 305. The fifth plane 345 may be perpendicular to the vectors 315 of portion of the plurality of landmarks 310 at the right side of the object model source 305. The second portion of the third plane 235 and the fourth plane (not shown in FIG. 2) may be altered from a rectangular plane to form a curvilinear plane such that fifth plane 345 has a shape, curvature, or the like to match the physical features of the object model source 305. The fifth plane 345 may approximate a portion of the right side of the object model source 305 in 2D. The fifth plane 345 may approximate the entire right side of the object model source 305 in 2D.

The first plane 325, the second plane 330, the third plane 335, the fourth plane 340, and the fifth plane 345 may intersect with one another to form a single plane on which the entire maxillofacial structure of the physical structure of the object model could be projected onto the plane, as described herein.

Figure 4:
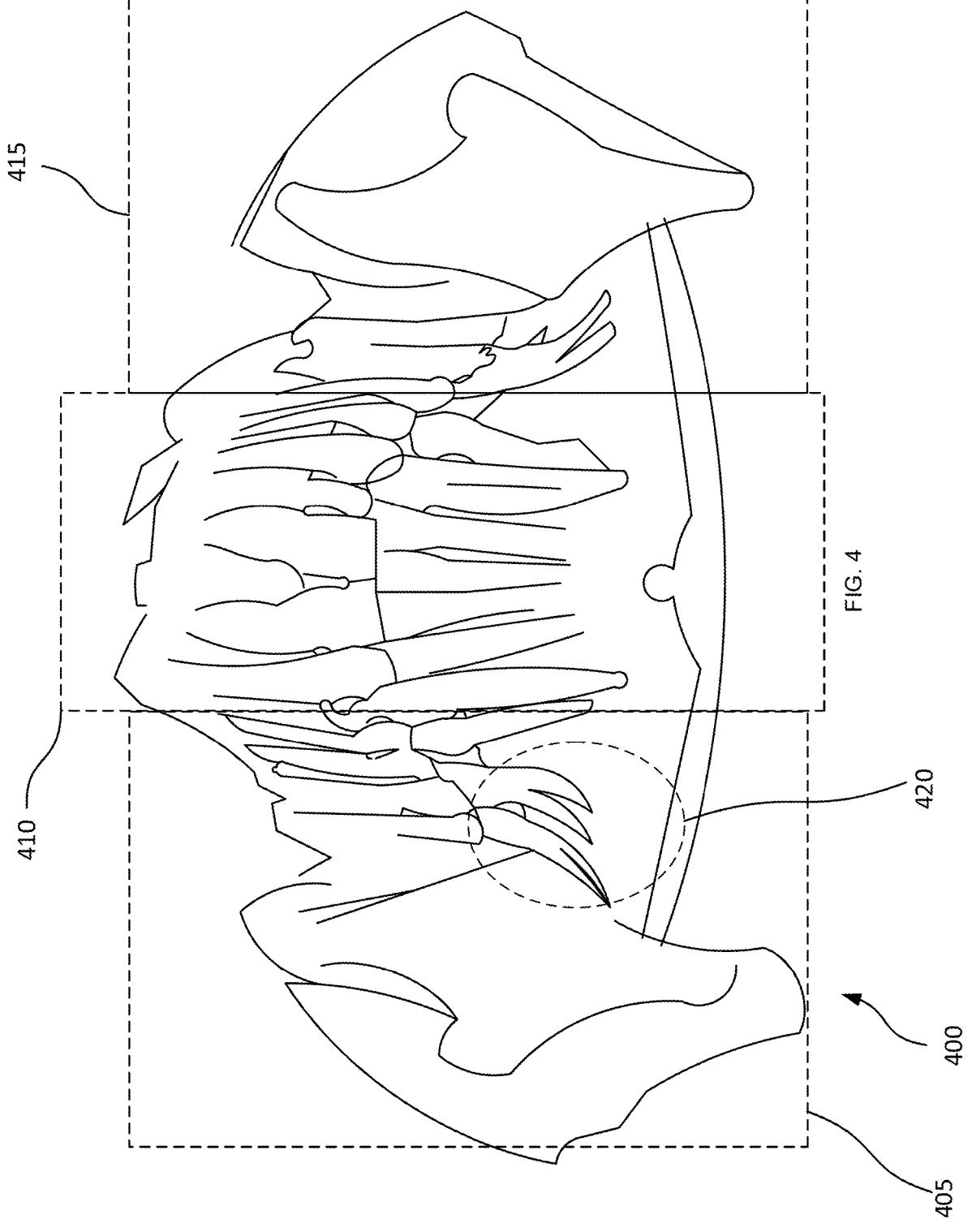
FIG. 4 illustrates a first projection of a physical structure in accordance with present implementations.

FIG. 4 illustrates a first projection of a physical structure in accordance with present implementations. As illustrated by way of example in FIG. 4, an example view of an example maxillofacial model 400 can be generated by projecting the object model source 205 onto the plurality of planes 220 of FIG. 2. The maxillofacial model 400 may include a first region 405, a second region 410, and a third region 415. The maxillofacial model 400 may include more than three regions. The first region 405 may illustrate a first portion (e.g., left, right, center, etc.) of the maxillofacial structure. By way of example, the first region 405 may illustrate the left portion of the object model source 205 which can be projected on to the first plane 225 of FIG. 2 to depict the left portion of the maxillofacial model 400. The second region 410 may illustrate a second portion (e.g., left, right, center, etc.) of the maxillofacial model 400. By way of example the second region 410 may illustrate the projection of the center portion of the object model source 205 on to the second plane 230 and the third plane 240 of FIG. 2 to depict the center portion of the maxillofacial model 400. The third region 415 may illustrate a third portion (e.g., left, right, center, etc.) of the maxillofacial model 400. By way of example, the third region 415 may illustrate the projection of the right portion of the object model source 205 onto the fourth plane (not shown in FIG. 2) to depict the right portion of the maxillofacial model 400. The maxillofacial model 400 generated by the plurality of planes 220 of FIG. 2 may be distorted so as to not accurately represent the maxillofacial structure of a patient. As illustrated by way of example in FIG. 4, the maxillofacial model 400 may have a distortion region 420 within the first region 405. The distortion region 420 may depict the distortion to the teeth and jaw line of a portion of the maxillofacial model 400. The distortion region 420 may depict the distortion to the teeth and the jaw of the entire maxillofacial model 400. The distortion to the maxillofacial model can be generated by projecting the object model source (e.g., object model source 105, object model source 205, object model source 305, etc.) on a plurality of planes which are rectangular and do not match the shape, curvature, or the like of the object model source 205.

Figure 5:
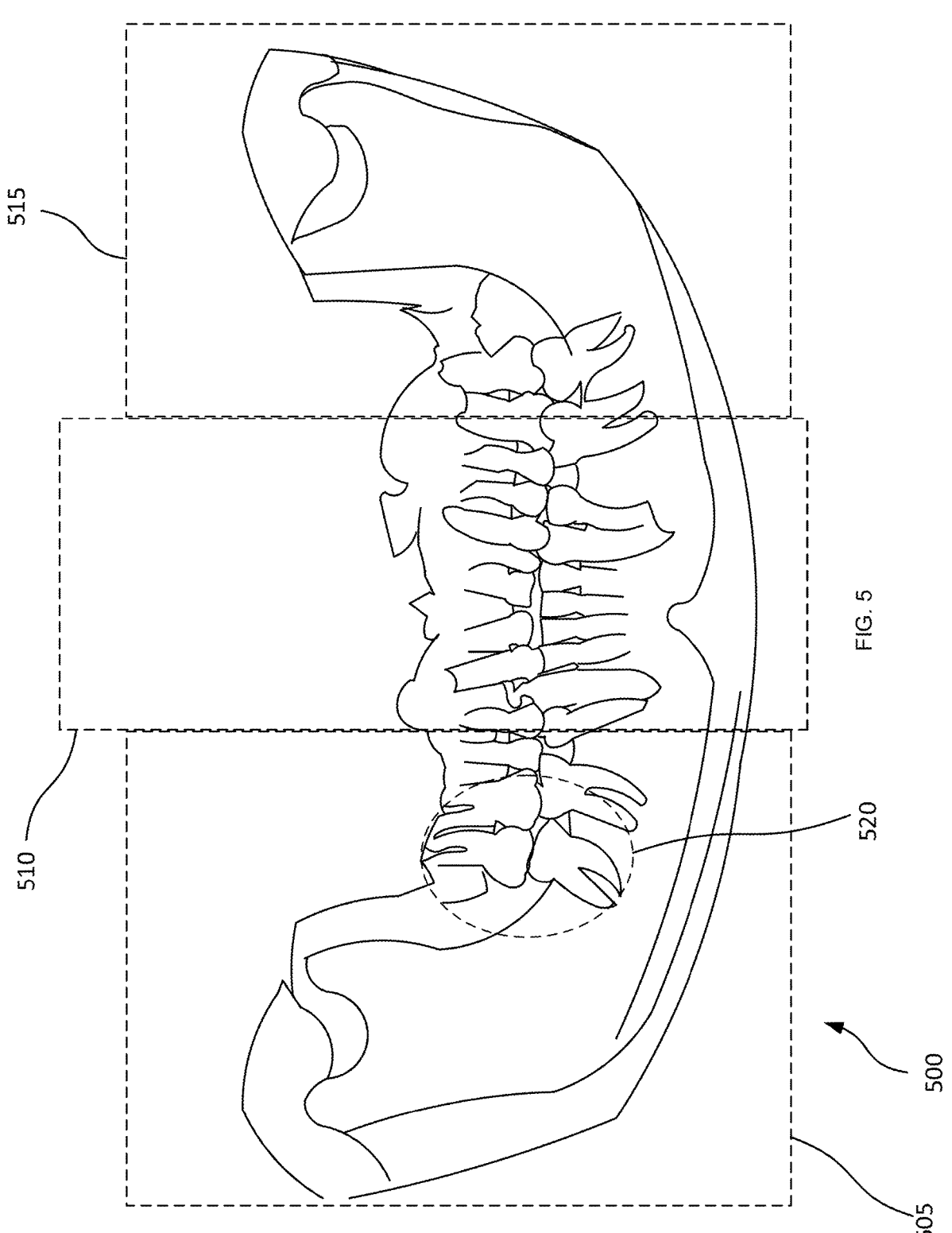
FIG. 5 illustrates a second projection of a physical structure further to the first projection of FIG. 4.

FIG. 5 illustrates a second projection of a physical structure further to the first projection of FIG. 4. As illustrated by way of example in FIG. 5, an example view of an example maxillofacial model 500 can be generated by projecting the object model source 305 onto the plurality of planes 320 of FIG. 3. The maxillofacial model 500 may include a first region 505, a second region 510, and a third region 515. The first region 505 illustrates a first portion (e.g., left, right, center, etc.) of the maxillofacial model 500. By way of example, the first region 505 depicts a projection of the left portion of object model source 305 onto the first plane 325 of FIG. 5 to depict the left portion of the maxillofacial model 500. The second region 510 illustrates a second portion (e.g., left, right, center, etc.) of the maxillofacial model 500. By way of example, the second region illustrates the center portion of the object model source 305 projected onto the second plane 330, third plane 335, and a portion of the fourth plane 340 of FIG. 5 to depict the center portion of the maxillofacial model 500. The third region illustrates a third portion (e.g., left, right, center, etc.) of the maxillofacial model 500. By way of example, the third region illustrates the left portion of the object model source 305 of FIG. 5 projected onto the portion of the fourth plane 340 and the fifth plane (not shown in FIG. 5). The maxillofacial model 500 generated by the projection of the object model source 305 onto the plurality of planes 320 does not include distortion. As illustrated by way of example in FIG. 5, the maxillofacial model has a non-distorted region 520. The non-distorted region 520 depicts the teeth and jaw of the maxillofacial model 500 having little to no distortion as compared to teeth and jaw in the distortion region 420 as shown in FIG. 4. The distortion may be drastically reduced due to the projecting the object model source 305 on to the plurality of planes 320 which are curvilinear to match the shape, curvature, or the like of the object model source 305.

Figure 6:
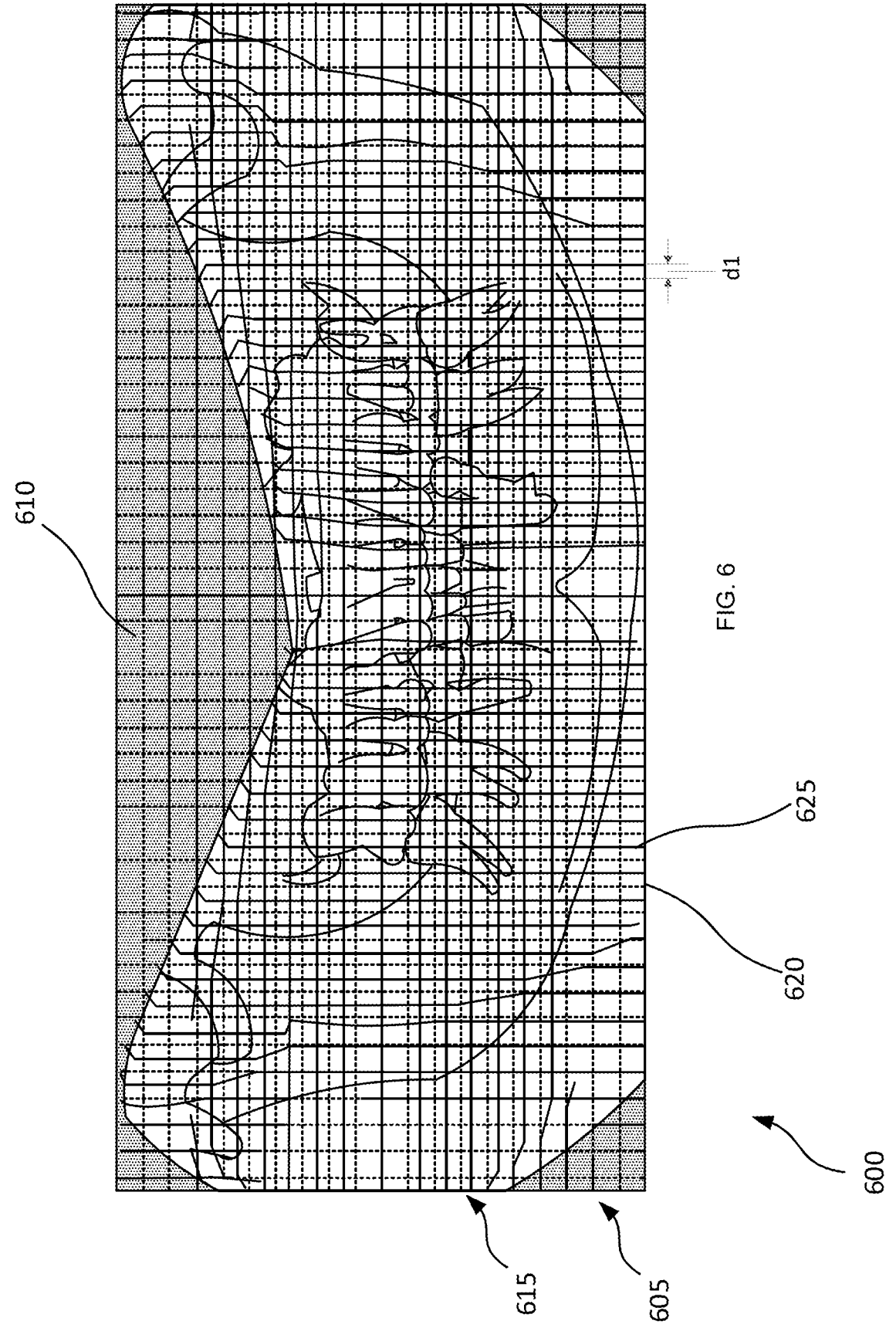
FIG. 6 illustrates a user interface including a second projection further to the second projection of FIG. 5.

FIG. 6 illustrates a user interface including a second projection further to the second projection of FIG. 5. As illustrated by way of example in FIG. 6, an example view of an example maxillofacial model 600 and an error system 605. The maxillofacial model 600 can be substantially similar to the maxillofacial model 500 as illustrated in FIG. 5. The error system 605 can be configured to depict the errors of the maxillofacial model 600. The error system 605 may depict the errors in the location of portions of the patient's dental structure or maxillofacial structure (e.g., teeth, jaw, etc.) between the maxillofacial model 600 and the location of the portions in the patient's dental structure or maxillofacial structure. The error system 605 may include edge portions 610. The edge portions 610 depict the empty space where the maxillofacial model 600 may not be mapped. The edge portion 610 assist in locating the maxillofacial model 600 such that a mesh grid 615 formed by the error system 605 can be overlaid on the maxillofacial model 600. The user interface may be presented on a display. The display may be associated with a computer, a smart phone, a tablet, a television, a monitor or any other device capable of displaying an image. In some implementations, a user may interact with the user interface via touch on the display.

The mesh grid 615 may include a plurality of true lines 620. The plurality of true lines 620 form a grid pattern over the maxillofacial model 600 and depict the location of the portion of the patient's dental structure or maxillofacial structure generated by the maxillofacial model 600. The mesh grid 615 may include a plurality of error lines 625. The plurality of error lines 625 form a grid pattern over the maxillofacial model 600 and the plurality of true lines 620 and depict the actual location of the portion of the patient's dental structure or maxillofacial structure. The distance, d1, between at least one of the error lines 625 and the at least one true line 620 defines the error between the maxillofacial model 600 and the actual patient's dental structure or maxillofacial structure. In some embodiments, the error lines 625 overlap with the true lines 620 such that no error exists between the maxillofacial model 600 and actual patient's dental structure or maxillofacial structure.

Figure 7:
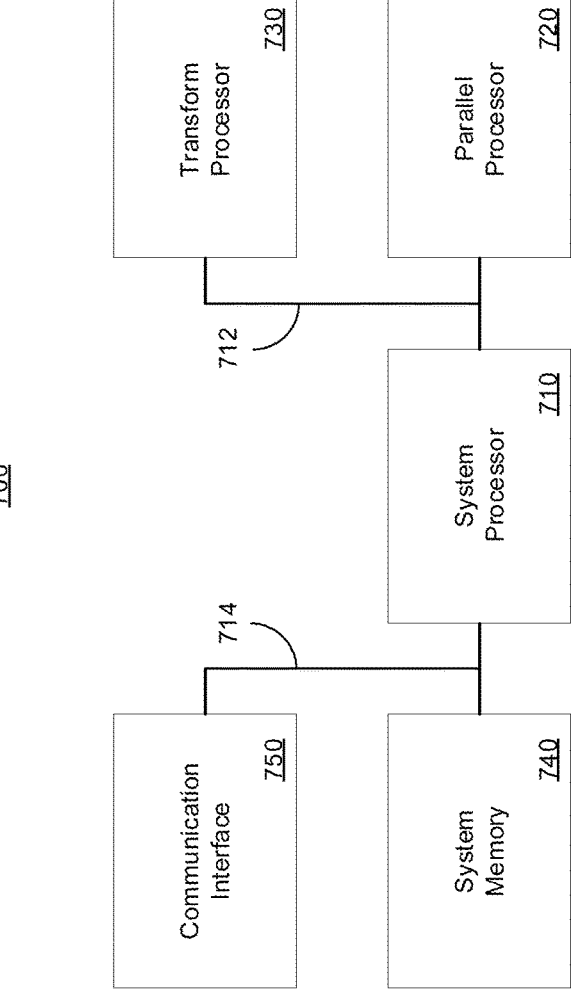
FIG. 7 illustrates a processing system, in accordance with present implementations.

FIG. 7 illustrates an example processing system, in accordance with present implementations. As illustrated by way of example in FIG. 7, an example processing system 700 may include a system processor 710, a parallel processor 720, a transform processor 730, a system memory 740, and a communication interface 750. In some implementations, at least one of the example processing system 700 and the system processor 710 may include a processor bus 712 and a system bus 714.

The system processor 710 may be operable to execute one or more instructions. The instructions may be associated with at least one of the system memory 740 and the communication interface 750. The system processor 710 may be an electronic processor, an integrated circuit, or the like including one or more of digital logic, analog logic, digital sensors, analog sensors, communication buses, volatile memory, nonvolatile memory, and the like. The system processor 710 may include but is not limited to, at least one microcontroller unit (MCU), microprocessor unit (MPU), central processing unit (CPU), graphics processing unit (GPU), physics processing unit (PPU), embedded controller (EC), or the like. The system processor 710 may include a memory operable to store or storing one or more instructions for operating components of the system processor 710 and operating components operably coupled to the system processor 710. The one or more instructions may include at least one of firmware, software, hardware, operating systems, embedded operating systems, and the like.

The processor bus 712 can be operable to communicate one or more instructions, signals, conditions, states, or the like between one or more of the system processor 710, the parallel processor 720, and the transform processor 730. The processor bus 712 may include one or more digital, analog, or like communication channels, lines, traces, or the like. It can be to be understood that any electrical, electronic, or like devices, or components associated with the system bus 714 can also be associated with, integrated with, integrable with, supplemented by, complemented by, or the like, the system processor 710 or any component thereof.

The system bus 714 may be operable to communicate one or more instructions, signals, conditions, states, or the like between one or more of the system processor 710, the system memory 740, and the communication interface 750.

The system bus 714 may include one or more digital, analog, or like communication channels, lines, traces, or the like. It can be to be understood that any electrical, electronic, or like devices, or components associated with the system bus 714 can also be associated with, integrated with, integrable with, supplemented by, complemented by, or the like, the system processor 710 or any component thereof.

The parallel processor 720 may be operable to execute one or more instructions concurrently, simultaneously, or the like. The parallel processor 720 may be operable to execute one or more instructions in a parallelized order in accordance with one or more parallelized instruction parameters. In some implementations, parallelized instruction parameters include one or more sets, groups, ranges, types, or the like, associated with various instructions. The parallel processor 720 may include one or more execution cores variously associated with various instructions. The parallel processor 720 may include one or more execution cores variously associated with various instruction types or the like. The parallel processor 720 may be an electronic processor, an integrated circuit, or the like including one or more of digital logic, analog logic, communication buses, volatile memory, nonvolatile memory, and the like. The parallel processor 720 may include but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It can be to be understood that any electrical, electronic, or like devices, or components associated with the parallel processor 720 can also be associated with, integrated with, integrable with, supplemented by, complemented by, or the like, the system processor 710 or any component thereof.

Figure 8:
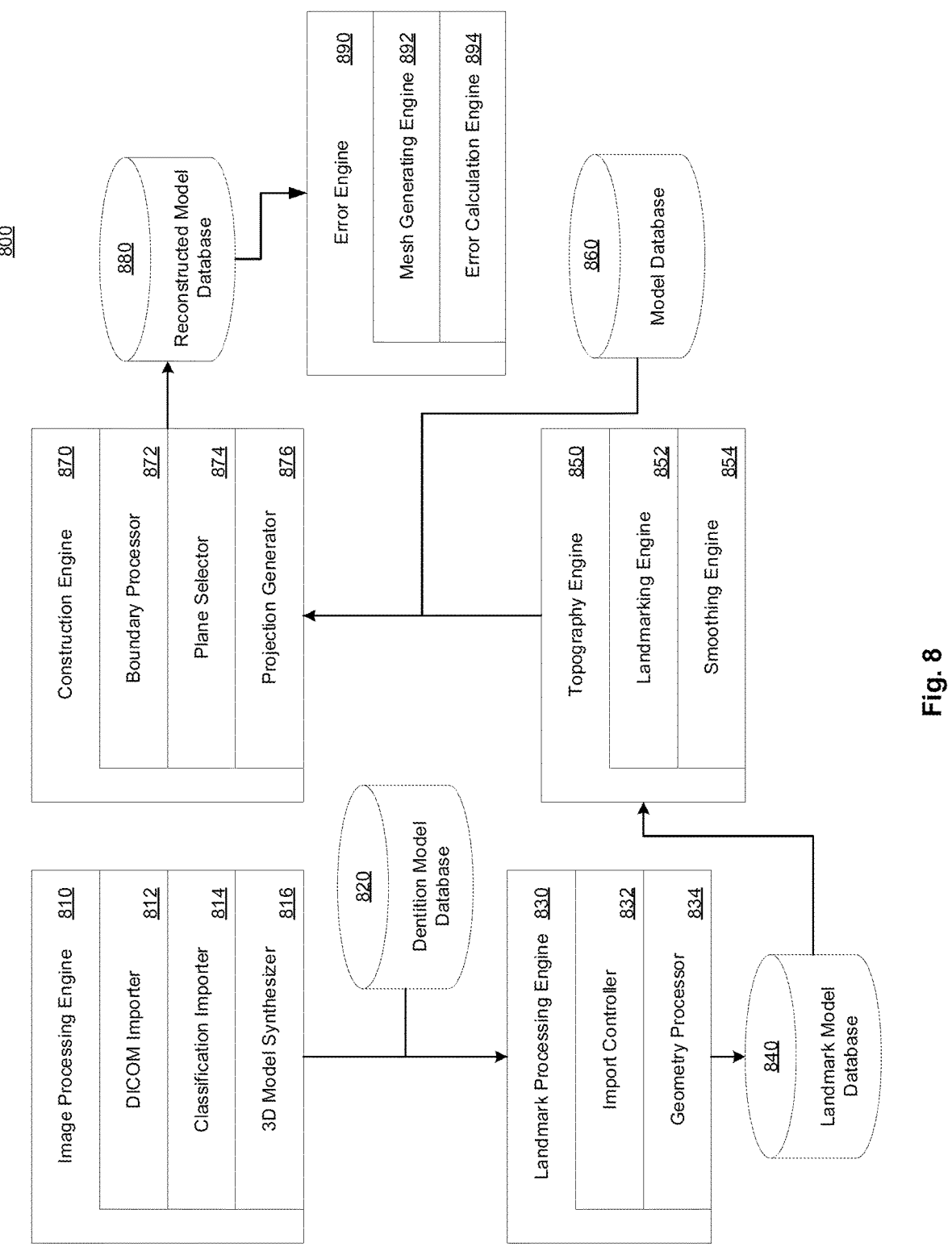
FIG. 8 illustrates a computing system, in accordance with present implementations.

In some implementations, various cores of the parallel processor 720 are associated with one or more parallelizable operations in accordance with one or more metrics, engines, models, and the like, of the example computing system of FIG. 8. As one example, parallelizable operations include processing portions of an image, video, waveform, audio waveform, processor thread, one or more layers of a learning model, one or more metrics of a learning model, one or more models of a learning system, and the like. In some implementations, a predetermined number or predetermined set of one or more particular cores of the parallel processor 720 are associated exclusively with one or more distinct sets of corresponding metrics, engines, models, and the like, of the example computing system of FIG. 8. As one example, a first core of the parallel processor 720 can be assigned to, associated with, configured to, fabricated to, or the like, execute one engine of the example computing system of FIG. 8. In this example, a second core of the parallel processor 720 can also be assigned to, associated with, configured to, fabricated to, or the like, execute another engine of the example computing system of FIG. 8. Thus, the parallel processor 720 may be configured to parallelize execution across one or more metrics, engines, models, and the like, of the example computing system of FIG. 8. Similarly, in some implementations, a predetermined number or predetermined set of one or more particular cores of the parallel processor 720 are associated collectively with corresponding metrics, engines, models, and the like, of the example computing system of FIG. 8. As one example, a first plurality of cores of the parallel processor can be assigned to, associated with, configured to, fabricated to, or the like, execute one engine of the example computing system of FIG. 8. In this example, a second plurality of cores of the parallel processor can also be assigned to, associated with, configured to, fabricated to, or the like, execute another engine of the example computing system of FIG. 8. Thus, the parallel processor 720 may be configured to parallelize execution within one or more metrics, engines, models, and the like, of the example computing system of FIG. 8.

The transform processor 730 may be operable to execute one or more instructions associated with one or more predetermined transformation processes. As one example, transformation processes include Fourier transforms, matrix operations, calculus operations, combinatoric operations, trigonometric operations, geometric operations, encoding operations, decoding operations, compression operations, decompression operations, image processing operations, audio processing operations, and the like. The transform processor 730 may be operable to execute one or more transformation processes in accordance with one or more transformation instruction parameters. In some implementations, transformation instruction parameters include one or more instructions associating the transform processor 730 with one or more predetermined transformation processes. The transform processor 730 may include one or more transformation processes. Alternatively, in some implementations, the transform processor 730 may be a plurality of transform processor 730 associated with various predetermined transformation processes. Alternatively, the transform processor 730 may include a plurality of transformation processing cores each associated with, configured to execute, fabricated to execute, or the like, a predetermined transformation process. The parallel processor 720 may be an electronic processor, an integrated circuit, or the like including one or more of digital logic, analog logic, communication buses, volatile memory, nonvolatile memory, and the like. The parallel processor 720 may include but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It can be to be understood that any electrical, electronic, or like devices, or components associated with the transform processor 730 can also be associated with, integrated with, integrable with, supplemented by, complemented by, or the like, the system processor 710 or any component thereof.

The transform processor 730 may be associated with one or more predetermined transform processes in accordance with one or more metrics, engines, models, and the like, of the example computing system of FIG. 8. In some implementations, a predetermined transform process of the transform processor 730 is associated with one or more corresponding metrics, engines, models, and the like, of the example computing system of FIG. 8. As one example, the transform processor 730 can be assigned to, associated with, configured to, fabricated to, or the like, execute one matrix operation associated with one or more engines, metrics, models, or the like, of the example computing system of FIG. 8. As another example, the transform processor 730 can alternatively be assigned to, associated with, configured to, fabricated to, or the like, execute another matrix operation associated with one or more engines, metrics, models, or the like, of the example computing system of FIG. 8. Thus, the transform processor 730 may be configured to centralize, optimize, coordinate, or the like, execution of a transform process across one or more metrics, engines, models, and the like, of the example computing system of FIG. 8. The transform processor may be fabricated to, configured to, or the like, execute a particular transform process with at least one of a minimum physical logic footprint, logic complexity, heat expenditure, heat generation, power consumption, and the like, with respect to at least one metrics, engines, models, and the like, of the example computing system of FIG. 8.

The system memory 740 may be operable to store data associated with the example processing system 700. The system memory 740 may include ones or more hardware memory devices for storing binary data, digital data, or the like. The system memory 740 may include one or more electrical components, electronic components, programmable electronic components, reprogrammable electronic components, integrated circuits, semiconductor devices, flip flops, arithmetic units, or the like. The system memory 740 may include at least one of a nonvolatile memory device, a solid-state memory device, a flash memory device, and a NAND memory device. The system memory 740 may include one or more addressable memory regions disposed on one or more physical memory arrays. In some implementations, a physical memory array may include a NAND gate array disposed on a particular semiconductor device, integrated circuit device, printed circuit board device, and the like.

The communication interface 750 may be operable to communicatively couple the system processor 710 to an external device. In some implementations, an external device may include but is not limited to a smartphone, mobile device, wearable mobile device, tablet computer, desktop computer, laptop computer, cloud server, local server, and the like. The communication interface 750 may be operable to communicate one or more instructions, signals, conditions, states, or the like between one or more of the system processor 710 and the external device. The communication interface 750 may include one or more digital, analog, or like communication channels, lines, traces, or the like. As one example, the communication interface 750 is or may include at least one serial or parallel communication line among multiple communication lines of a communication interface. The communication interface 750 may be or may include one or more wireless communication devices, systems, protocols, interfaces, or the like. The communication interface 750 may include one or more logical or electronic devices including but not limited to integrated circuits, logic gates, flip-flops, gate arrays, programmable gate arrays, and the like. The communication interface 750 may include ones or more telecommunication devices including but not limited to antennas, transceivers, packetizers, wired interface ports, and the like. It can be understood that any electrical, electronic, or like devices, or components associated with the communication interface 750 can also be associated with, integrated with, integrable with, replaced by, supplemented by, complemented by, or the like, the system processor 710 or any component thereof.

FIG. 8 illustrates an example computing system, in accordance with present implementations. The example computing system 800 may correspond to the system memory 740. As illustrated by way of example in FIG. 8, an example computing system 800 may include an image processing engine 810, a dentition model database 820, a landmark processing engine 830, a landmark model database 840, a topography engine 850, a model database 860, a construction engine 870, a reconstructed model database 880, and an error engine 890. It can be understood that one or more of the engines and databases can be located, stored, or the like, in a single logical or physical block or areas of the system memory 740, or distributed at or across multiple physical or virtual devices, or associated with corresponding dedicated devices.

The image processing engine 810 may be operable to generate at least one three-dimensional (3D) model based on one or more two-dimensional (2D) images. The image processing engine 810 may include at least one of a DICOM importer 812, a classification importer 814, and a three-dimensional model synthesizer 816.

The DICOM importer 812 may be operable to obtain one or more images in a DICOM format or the like. The DICOM importer 812 may be operable to obtain one or more images along one or more axes or planes corresponding to a patient facial region, dentition region, oral region, maxillofacial region, or the like. It can be understood that the DICOM importer 812 can obtain and process images in formats other than DICOM images, including but not limited to PNG, SVG, BMP, JPG, JPEG, JPEG2000, TIFF, and the like.

The classification importer 814 may be operable to obtain one or more classifications associated with one or more of the 2D images obtained by the DICOM importer 812. In some implementations, classifications include one or more tags, associations, flag, bits, strings, or the like associated with a corresponding one or more of the 2D images and indicating a characteristic of those 2D images. As one example, a classification can include an indication that a particular 2D image is associated with a particular age, demographic, gender, health condition, or the like. The 2D images can be associated with more than one classification that as a group can identify a 2D image classification with increased granularity. In this example, a group of 2D images can be classified as associated with a gender classification indicating a female gender, and an age classification indicating 10 years of age. As another example, a group of 2D images can be classified as associated with an individual from whom the 2D images are derived, associated, or the like. Thus, all 2D images associated with both of these classifications can be presumed to have features corresponding to 10 year old females. Thus, in some implementations, a composite 3D model based on one more classifications can be generated. The classification importer 814 can import 2D images associated with one or more classifications. The classification importer 814 can import classifications independently of 2D images and associate classifications with various 2D images in accordance with a prompt or other user input.

The three-dimensional (3D) model synthesizer 816 may be operable to generate at least one 3D model corresponding to one or more 2D images. The 3D model synthesizer 816 may be operable to filter, select, block, or the like, one or more 2D images based on one or more classifications. As one example, the 3D model synthesizer 816 can select only 2D images associated with a particular classification or particular set of classifications. Thus, the 3D model synthesizer 816 can select, for example, only 2D images associated with a particular individual or a particular subset of classifications. As one example, a subset of classifications can be applied to select only 2D images associated with females between ages 6 and 12. As another example, a subset of classifications can be applied to select only 2D images associated with males between ages 45 and 65. The 3D model synthesizer 816 may generate a 3D model based on the selected 2D images, resulting in a 3D model corresponding to at least one of the 2D selected 2D images. The 3D model may include one or more 3D features corresponding to one or more of the selected 2D images. Thus, the 3D model synthesizer 816 may be operable to generate a 3D model associated with 2D images of a particular individual, and to generate a 3D model associated with 2D images corresponding to individuals sharing one or more particular classifications.

The dentition model database 820 may include at least one dentition model corresponding to at least one dentition structure associated with an individual. The dentition model database 820 may include class models associated with individual classifications, composite classifications, or the like. Thus, the dentition model database 820 may include landmark models associated with particular individuals and with composite classifications of individuals based on or more classifications.

The landmark processing engine 830 may be operable to place one or more landmarks at a 3D model and generate one or more landmark models based on the placed landmarks. The landmark processing engine 830 may be operable to place one or more landmarks at one or more particular coordinates in a 3D model associated with that 3D model based on landmark metrics obtained from a landmark metric database, and by evaluating portions of the 3D model or the 2D image data associated with the 3D model by the landmark metrics. Thus, the landmark processing engine 830 may identify one or more dentition structures in the dentition model by correlating various features of the dentition model with predetermined identified features based on the landmark metrics. Coupled with the landmark identifiers associated with each landmark the landmark processing engine 830 can identify key features, positions, edges, boundaries, or the like within a dentition model by the landmarks placed at particular coordinates therein. The landmark processing engine 830 may include at least one of an import controller 832 and a geometry processor 834.

The import controller 832 may be operable to import landmarks associated with at least one particular dentition model. The import controller 832 may be operable to obtain one or more dentition models. As one example, the import controller 832 can obtain classifications associated with a target model including a reference model corresponding to a male and to an individual having an age of 10 years, and can obtain a reference model associated with the corresponding classifications. The import controller 832 can obtain a composite dentition model associated with a plurality of individuals.

The geometry processor 834 may be operable to generate at least one landmark model including one or more landmarks associated with a dentition model. The geometry processor 834 may generate one or more node graphs including landmarks associated with the dentition model. The geometry processor 834 may generate one or more edges through the dentition model that terminate at various landmarks. The geometry processor 834 may generate edges terminating at various predetermined pairs of landmarks. As one example, the geometry processor 834 can generate an edge associated with an edge of a tooth between two landmarks respectively including landmark identifiers for various points along the surface of a tooth. As another example, the geometry processor 834 can generate an edge associated with an edge indicating a contact location between a tooth and gums of an individual or composite of individuals.

The landmark model database 840 may include at least one landmark model associated with at least one dentition model. The landmark model may be associated with a dentition model and may include multiple landmarks identifying various physical features of the dentition model individually. Thus, the landmark model database 840 may include at least one landmark model uniquely corresponding to a dentition structure of a particular corresponding dentition model. It can be understood that this unique correspondence advantageously enables generation and reconstructions of highly-accurate and individualized dentition models for dental and medical interventions.

The topography engine 850 may be operable to generate a model corresponding to a dentition model associated with a plurality of landmarks. The topography engine 850 may generate a topographical representation collectively representing a plurality of dentition features, including teeth, gums, jawlines, gum lines, tooth structures, and the like. The topography engine 850 may generate a model with resolution capable of identifying unique structures associated with an individual's dentition model. As one example, a resolution can be a minimum distance between landmarks. As another example, a resolution can be a maximum number of landmarks associable within a particular area or volume within the dentition model. The topography engine 850 may be operable to generate smoothed surfaces or the like from one or more edges connecting various landmarks in the landmark model for the dentition model. It can be understood that the edges can be transformed into surfaces in accordance with one or more characteristics of landmarks, or edges of the landmark model. The topography engine 850 may include at least one of a landmarking engine 852 and a smoothing engine 854.

It can be understood that the parallel processor 720 can execute operations corresponding to the topography engine 850 by at least parallelizing execution of various landmarks and surfaces to advantageously increase speed and accuracy not otherwise achievable manually or with conventional or generic processors. It can be further understood that the transform processor 730 can execute operations corresponding to the topography engine 850 by at least executing various surfaces transforms to advantageously increase speed and accuracy not otherwise achievable manually or with conventional or generic processors.

The landmarking engine 852 may be operable to generate a including one or more graph edges terminating or intersecting one or more landmarks of the landmark model. The landmarking engine 852 may generate edges corresponding to a subset of landmarks of the landmark model. As one example, the landmarking engine 852 can generate edges between landmarks having a particular classification associated with a particular physical structure of the dentition model. As another example, the particular classification can correspond to an identifier of a dentition structure and a location on the dentition structure, such as "top" of a "tooth." It can be understood that the particular classification can correspond to various types of teeth, gums, locations thereof, features thereon, or the like. It can be further understood that the landmarking engine 852 can thus generate a that connects landmarks corresponding to a particular connected structure in the dentition model, and leave unconnected landmarks corresponding to disconnected structures in the dentition model. As one example, the landmarking engine 852 can connect two landmarks with particular classifications for a top and a side of the same tooth, but leave unconnected two adjacent landmarks with particular classifications for a top of an upper incisor and a top of a lower incisor, because separate incisors are not typically connected in a dentition model or a physical dental structure.

The smoothing engine 854 may be operable to transform one or more edges of the generated by the landmarking engine 852 into surfaces. In some implementations, surfaces can include curved topographical structures having one or more arcs, bends, deformations, or the like. The surfaces may be transformed based on a relationships to one or more landmarks on which a on which the surface is based. As one example, the relationship can be an intersecting relationship in which the edge or a plurality of edges intersect with but do not terminate at a particular landmark. As another example, the relationship can be an endpoint relationship in which the edge or a plurality of edges intersect with and terminate at a particular landmark.

The model database 860 may include at least one model associated with at least one dentition model. The model may associated with a landmark model corresponding to a dentition model and may include multiple landmarks identifying various physical features of the dentition model individually. The model also may include multiple edges or surfaces identifying various physical features of the dentition model individually. Thus, the model database 860 may include at least one model uniquely corresponding to a dentition structure of a particular corresponding dentition model. It can be understood that this unique correspondence advantageously enables generation and reconstructions of highly-accurate and individualized dentition models for dental and medical interventions.

The construction engine 870 may be operable to generate at least one reconstructed model associated with a dentition model and based on a model associated with the dentition model. The construction engine 870 is operable to generate a two-dimensional (2D) projection of the model onto one or more planes. It can be understood that a plane can be an anatomical plane associated with one or more of the dentition model, the landmark model, and the model. As one example, an anatomical plane can be a frontal plane. Thus, the construction engine 870 can advantageously generate a frontal plane projection of a model of a dentition model, where the dentition model is generated based on at least one 2D image not take from that frontal plane. It can be understood that the construction engine 870 can generate 2D projections corresponding to planes other than the frontal plane. The construction engine 870 may include at least one of a boundary processor 872, a plane selector 874, and a projection generator 876.

It can be understood that the parallel processor 720 can execute operations corresponding to the construction engine 870 by at least parallelizing execution of various landmarks and surfaces to advantageously increase speed and accuracy of boundary processing and projection generation not otherwise achievable manually or with conventional or generic processors. It can be further understood that the transform processor 730 can execute operations corresponding to the construction engine 870 by at least executing various projection transforms to advantageously increase speed and accuracy not otherwise achievable manually or with conventional or generic processors.

The boundary processor 872 may be operable to segment a portion of the associated with key anatomical features from a remainder of the model. As one example, key anatomical features include teeth, gums, gum lines, and the like. The boundary processor 872 identifies one or more landmarks, edges, or surfaces associated with predetermined identifiers indicating a boundary enclosing key anatomical features. The boundary processor 872 may identify one or more landmarks, edges, or surfaces by generating identifiers indicating a boundary enclosing key anatomical features, based on location, orientation, or the like, of the landmarks, edges, or surfaces. It can be understood that that location and orientation can be absolute with respect to a coordinate system, or relative with respect to one or more other features of the dentition model, landmark model, or model.

The plane selector 874 may be operable to select a plane on which a projection of the model is generated. The plane selector 874 may generate a plane corresponding to an anatomical plane. As one example, the plane selector 874 can select a frontal plane. Thus, the plane selector 874 can advantageously select one or more planes on which to generate a 2D projection, including planes not available for viewing based on images received at the image processing engine 810. The plane selector 874 may be operable to transform a plurality of planes, as shown in FIG. 2, to a plurality of planes, as shown in FIG. 3. By way of example, the plane selector 874 may transform the first plane 225 to the first plane 325 as shown in FIG. 3 such that the first plane is smooth. The plane selector 874 may be operable similarly for the plurality of planes, as shown in FIG. 2.

The projection generator 876 may be operable to generate a 2D projection of the model or the dentition model based on the selected plane. The projection generator 876 may project one or more landmarks from the mode onto the projection plane. The projection generator 876 may project portions of images of the dentition model proximate to various landmarks, edges, or surfaces of the model onto the projection plane. It can be understood that the projection generator 876 can advantageously generate an image of the dentition model from a perspective different than imagery input to generate the dentition model. It can be further understood that the projection generator 876 can generate an image with photographic detail by projection portions of images. Thus, the projection generator 876 advantageously may generate a photographic projection of a dentition model from the viewing angle of the projection plane. It can be further understood that the projection generator 876 can generate the projection, photographic or otherwise, with minimal or no distortion of the resulting image. As one example, the projection generator 876 can generate a frontal image projection of dentition structures that preserves true shapes and sizes of teeth, gums, and the like as indicated in the dentition model. In some embodiments, the projection generator 876 projects the one or more landmarks 310 as shown in FIG. 3 on to the plurality of planes 320 as shown in FIG. 3. By projecting the one or more landmarks 310 on to the plurality of planes, a maxillofacial model 500, as shown in FIG. 5 may be generated, as described herein.

The reconstructed model database 880 may include at least one reconstructed model (e.g., maxillofacial model 500, etc.) associated with one or more dentition models. The reconstructed model may include one or more landmarks associated with a landmark model or a model for an individual. The reconstructed model database 880 may include reconstructed models associated with orientations of corrected orthodontic structures including dentition structures and maxillofacial structures for particular patients. Thus, the reconstructed model database 880 may include landmark models associated with particular orthodontic states of maxillofacial and dentition structures indicating optimal, correct, healthy, preferred, or like arrangement of those structures for a particular patient's dental structure, maxillofacial structure, or both.

The error engine 890 may be operable to determine the error between the reconstructed model within the reconstructed model database 880 and an actual maxillofacial structure or dental structure of a patient. The error engine 890 determines the location of a portion (e.g., tooth, jaw, jaw line, etc.) on the reconstructed model and compares the determined location with the actual location of the portion on the patient's dental structure or maxillofacial structure. In some embodiments, the error engine 890 may include a mesh generating engine 892 and an error calculating engine 894.

The mesh generating engine 892 may be operable to generate a plurality of mesh grids over the reconstructed model. The mesh generating engine 892 may be operable a first mesh grid of true lines over the reconstructed model where the true lines define the actual location of the portion of the dental structure or maxillofacial structure of the patient's dental structure or maxillofacial structure on the patient. By way of example, the true lines 620 are depicted in FIG. 6. The mesh generating engine 892 may be operable to generate a second mesh grid of error lines over the reconstructed model and the first mesh where the error lines define the location of the portion of the patient's dental structure or maxillofacial structure on the reconstructed model. The error lines are true lines may be offset by some distance. By way of example, the error lines 625 are depicted in FIG. 6.

The error calculating engine 894 may be operable to calculate the error between the true lines and the error lines generated over the reconstructed model. The error calculating engine 894 calculates the offset distance between the true lines and the error lines. The error calculating engine 894 may determine that the true lines and the error lines overlap such that no error is present.

FIG. 9 illustrates a method of transforming a dentition structure in accordance with present implementations. At least one of the processing system 700 and the computing system 800 can perform method 900 according to the present implementations. In some implementations the method 900 begins at step 910.

At step 910, an example system generates a surface geometrically connecting one or more landmarks. The landmarks are associated with one or more physical features of a physical object (e.g., dentition structure, maxillofacial structure, etc.). The physical object may be a dentition structure where the physical features include one or more teeth and soft tissue adjacent to the tissue. The physical object may be a maxillofacial structure where the physical feature may include an upper dental arch region or a lower dental arch region. In some implementations, step 910 may include step 912. At step 912, the example system generates one or more planes corresponding to the one or more surfaces of the physical object. In some implementations the one or more planes correspond to the one or more landmarks. In some implementations, step 912 may include step 914. At step 914, the example system generates one or more planes that are tangential to the one or more surfaces of the physical object. The method 900 then continues to step 920.

At step 920, the example system generates a model comprising one or more edges and the one or more landmarks. The generated model may be a three-dimensional model of the physical object comprising the one or more edges and the one or more landmarks. In some implementations, step 920 may include step 922. At step 922, the example system smooths the model based on the surface of the physical object. The method then continues to step 930.

At step 930, the example system identifies at least one boundary of the model based on one or more of the edges and the one or more landmarks. The at least one boundary may include a plurality of boundary edges among the edges. The method then continues to step 940.

At step 940, the example system selects at least one region associated with at least one corresponding physical feature of the physical object. In some implementations, step 940 may include at least one of steps 942 and 944. At step 942, the example system selects a first region corresponding to a first physical feature of the physical object. At step 944, the example system selects a second region corresponding to a second physical feature of the physical object. The method then continues to step 950.

At step 950, the example system projects the selected region on to a predetermined projection plane. The predetermined projection plane may correspond to a frontal view of the physical object. The predetermined projection plane may be aligned with an anatomical frontal plane of the physical object. In some implementations, step 950 may include step 952. At step 952, the example system projects at least one error indication onto the predetermined projection plane. The method then continues to step 960.

At step 960, the example system transforms a shape of the physical features of the physical object based on the projection. In some implementations the method ends at step 960.

The herein described subject matter sometimes illustrates different components contained within, or connected with, different other components. It can be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method of transforming a dentition structure, comprising:
generating a surface geometrically connecting one or more landmarks, the landmarks being associated with one or more physical features of a physical object;

generating a model comprising one or more edges and the one or more landmarks;
identifying at least one boundary of the model based on one or more of the edges and the one or more landmarks;
selecting at least one region associated with at least one corresponding physical feature of the physical object;
projecting the selected region onto a predetermined projection plane to form a projection; and
smoothing an edge of the model such that the smoothed edge matches a shape of the surface proximate to at least one target landmark among the landmarks connected to the edge.

2. The method of claim 1, further comprising:
generating one or more planes corresponding to one or more surfaces of the physical object.

3. The method of claim 2, wherein the planes correspond to one or more of the landmarks.

4. The method of claim 2, wherein the generating the planes comprises generating one or more planes tangential to one or more surfaces of the physical object.

5. The method of claim 1, wherein the at least one boundary comprises a plurality of boundary edges among the edges.

6. The method of claim 5, wherein the physical object is a dentition structure and the physical features include one or more teeth and soft tissue adjacent to the teeth.

7. The method of claim 1, wherein the predetermined projection plane corresponds to a frontal view of the physical object, and is substantially aligned with an anatomical frontal plane of the physical object.

8. The method of claim 1, wherein the selecting the at least one region associated with the at least one corresponding physical feature of the physical object comprises:
selecting a first region corresponding to a first physical feature of the physical object; and
selecting a second region corresponding to a second physical feature of the physical object.

9. The method of claim 8, wherein the physical object comprises a maxillofacial structure, and the first physical feature comprises an upper dental arch region.

10. The method of claim 9, wherein the second physical feature comprises a lower dental arch region.

11. The method of claim 1, wherein the projecting the selected region onto a predetermined projection plane to form the projection comprises:
projecting at least one error indication onto the predetermined projection plane.

12. A system for transforming a dentition structure, comprising:
a topography engine configured to generate a surface geometrically connecting one or more landmarks, the landmarks being associated with physical features of a physical object, and to generate a model comprising the surface and the landmarks; and
a construction engine operatively coupled to the topography engine and configured to identify at least one boundary of the model based on the surface and the landmarks, to select the at least one region associated with at least one corresponding physical feature of the physical object, to project the selected region onto a predetermined projection plane to form a projection,
wherein the topography engine is further configured to smooth the surface of the model proximate to at least one target landmark among the landmarks connected to the surface such that the smoothed surface matches a shape of the physical object proximate to the at least one target landmark.

13. The system of claim 12, further comprising:

an image processing engine configured to obtain one or more images of the physical object, and to generate a three-dimensional model of the physical object including the physical features; and a landmark processing engine operatively coupled to the image processing engine and the topography engine, and configured to associate the landmarks with one or more corresponding geometric locations with the three-dimensional model, the geometric location corresponding to one or more of the physical features.

14. The system of claim 12, wherein the topography engine is further configured to generate one or more planes corresponding to one or more surfaces of the physical object.

15. The system of claim 14, wherein the planes correspond to one or more of the landmarks.

16. The system of claim 14, wherein the generating the planes comprises generating one or more planes tangential to one or more surfaces of the physical object.

17. A computer readable medium comprising non-transitory machine readable media including one or more instructions stored thereon and executable by a processor to:

generate, by a processor, a surface geometrically connecting one or more landmarks, the landmarks being associated with one or more physical features of a physical object;

generate, by the processor, a model comprising edges and the landmarks;

identify, by the processor, at least one boundary of the model based on one or more of the edges and the landmarks;

select, by the processor, at least one region associated with at least one corresponding physical feature of the physical object;

project, by the processor, the selected region onto a predetermined projection plane to form a projection; and smooth, by the processor, an edge of the model such that the smoothed edge matches a shape of the surface proximate to at least one target landmark among the landmarks connected to the edge.

18. The computer readable medium of claim 17, wherein the computer readable medium further includes one or more instructions executable by the processor to:

project, by the processor, at least one error indication onto the predetermined projection plane.

* * * * *